(12) United States Patent
Brown (10) Patent No.: US 6,392,565 B1
(45) Date of Patent: May 21, 2002

(54) AUTOMOBILE TRACKING AND ANTI-THEFT SYSTEM (75) Inventor: William W. Brown, Anderson, SC (US)

(73) Assignee: EworldTrack, Inc., Anderson, SC (US)

( * ) Notice: Subject to any disclaimer, the term of this patent is extended or adjusted under 35 U.S.C. 154(b) by 0 days.

(21) Appl. No.: 09/533,446

(22) Filed: Mar. 23, 2000

Related U.S. Application Data (60) Provisional application No. 60/153,350, filed on Sep. 10, 1999.

(51) Int. Cl.⁷ .............................................. G08G 1/123
(52) U.S. Cl. ........................ 340/988; 340/989; 701/213
(58) Field of Search ................................ 340/988, 989, 340/425.5, 426, 825.36, 825.49, 539, 531; 701/213; 342/357

(56) References Cited

U.S. PATENT DOCUMENTS

| | | | |
|---|---|---|---|
| 5,043,736 A | 8/1991 | Darnell et al. ............... 342/357 |
| 5,122,959 A | 6/1992 | Nathanson et al. .......... 364/436 |
| 5,317,323 A | 5/1994 | Kennedy et al. ............. 342/457 |
| 5,388,147 A | 2/1995 | Grimes .......................... 379/59 |
| 5,576,716 A | 11/1996 | Sadler .......................... 342/357 |
| 5,629,678 A | 5/1997 | Gargano et al. ............. 340/573 |
| 5,657,008 A | * | 8/1997 | Bantli .......................... 340/941 |
| 5,712,619 A | 1/1998 | Simkin ......................... 340/539 |
| 5,731,757 A | 3/1998 | Layson, Jr. .................. 340/573 |
| 5,742,233 A | 4/1998 | Hoffman et al. ............ 340/573 |
| 5,812,087 A | 9/1998 | Krasner ....................... 342/357 |
| 5,835,907 A | 11/1998 | Newman ..................... 707/710 |
| 5,838,237 A | 11/1998 | Revell et al. ................ 340/573 |
| 5,870,934 A | * | 2/1999 | Cullinan ...................... 411/910 |
| 5,892,454 A | 4/1999 | Schipper et al. ........ 340/825.37 |
| 5,905,461 A | 5/1999 | Neher .......................... 342/357 |
| 5,914,675 A | 6/1999 | Tognazzini .................. 340/989 |
| 5,929,806 A | 7/1999 | Birchler et al. ............. 342/357 |
| 6,014,080 A | 1/2000 | Layson, Jr. ................ 340/573.1 |
| 6,028,537 A | * | 2/2000 | Suman et al. ............... 340/988 |
| 6,131,067 A | * | 10/2000 | Gererd et al. ............... 340/989 |
| 6,243,647 B1 | * | 6/2001 | Berstis et al. ............... 701/213 |

* cited by examiner

*Primary Examiner*—John Alexander Tweel, Jr.
(74) *Attorney, Agent, or Firm*—McNair Law Firm, PA; Cort Flint (57) ABSTRACT A computerized system deters theft of a vehicle where a subscriber maintains a remote computer terminal. A web host is connected to a wide area web network and includes a computer readable medium. A location unit is carried by the vehicle and calculates the location of the vehicle at any given time and transmits a low power digital location data packet having location data. A computer program has instructions embodied in computer readable code on the web host and receives a tracking request from a subscriber and transmits a tracking call to the location unit. The low power digital location data packet is transmitted from the location unit and represents the current position of the vehicle.

44 Claims, 6 Drawing Sheets

AUTOMOBILE TRACKING AND ANTI-THEFT SYSTEM

This application claims the priority of U.S. Provisional Application Ser. No. 60/153,350 filed on Sep. 10, 1999, entitled *Multi-User Global Position Tracking System and Method* and 09/497,733 filed on Feb. 4, 2000, entitled *Multi-User Global Position Tracking System and Method* which applications are hereby incorporated in this disclosure by reference.

BACKGROUND OF THE INVENTION

The invention relates to a system and method for deterring automobile thefts from private and commercial owners, such as new and used car dealers, and particularly to a system and method for tracking automobiles driven from dealer lots as when vehicles are being test driven and when demo vehicles are taken off the premises.

The problem of vehicle theft from commercial and private owners is a problem which needs considerable attention. The United States, in particular, is an automobile-based society. Large numbers of automobiles are stolen from private owners every year. The number of stolen vehicles increases every year. In particular, there is a problem of deterring and preventing vehicle theft from new and used car dealers by customers test driving vehicles, or other persons driving vehicles from the dealer's premises and not returning them. The number of drivers and vehicles is increasing every year. In purchasing an automobile it is customary for the customer to take the vehicle for a test drive, or even take the vehicle home overnight. While numerous devices and methods have been devised to deter the customer from stealing the vehicle, the problem has become attenuated by the increased number of drivers and car purchasers. For example, the dealer may write the customer's drivers license number down, or retain the customer's own automobile keys, and other means of deterring theft have been utilized. However these have not been satisfactory in dealing with the problem. In other instances, it is merely desirable to know where the customer has taken the vehicle, possibly for illegal uses.

The cost of automobile insurance has increased as the number of vehicle thefts has increased. In particular, the theft of certain types of vehicles has increased, such as certain types of popular and/or expensive vehicles from commercial and private owners.

Accordingly, an object of the invention is to provide a system and method for deterring automobile theft from commercial and private owners.

Another object is to prevent the theft of vehicles being taken from automobile dealer lots.

Another object of the invention is to provide a system and method for deterring and preventing automobile theft from automobile dealers while being test driven by customers wherein the vehicle can be tracked while it is being test drive.

Still another object of the invention is to provide a system and method wherein large numbers of vehicles can be concurrently tracked if stolen from automobile dealers or private owners to prevent theft of the vehicles.

SUMMARY OF THE INVENTION

The above objectives are accomplished according to the present invention by providing a web host connected to a wide area web network, wherein the web host has a computer readable medium. A computer program is stored on the web host for being connected to an automobile subscriber to the network. A unique location unit is carried by the vehicle. The location unit preferably includes a GPS chip for calculating the position of the vehicle. The location unit includes a processor for accessing location data calculated by the GPS chip. A transceiver included in the unit is controlled by the processor to automatically answer a tracking call from the web host, transmit location data representing the current position of the vehicle back to the web host, and then hang up. Any one of a number of automobile owners who subscribe to the network may concurrently send tracking requests to the web host wherein the web host automatically sends out tracking calls to each identified vehicle/location unit, receives the current locations of the vehicles from the location units, and transmits location data to the subscribers for display at the subscribers' computer terminals. In the case of a dealer, the location unit is advantageously made integral with a special dealer "Internet tracking tag," or affixed to the tag. The tag is affixed to the vehicle using locking screws only the dealer can remove.

A car dealer is most vulnerable to liabilities and loss when a car is driven off the lot, whether on a test drive or stolen. When a car is stolen and law enforcement is involved in a chase with an accident occurring, the dealer may be liable. Many times dealers have cars missing from their lots and are not able to locate them. During peak hours, many times a salesman is unable to go on demo rides with customers. The present invention helps keep salesmen on the floor.

By simply attaching an Internet tracking tag to every car that leaves the lot, a dealer can go online and locate that vehicle anywhere in the country at any given moment, thus deterring theft and eliminating the danger of a high speed chase. Law enforcement or the dealer can decide the best time and place to intercept and retrieve the stolen vehicle.

The automobile tracking anti-theft system and method uses cutting edge technology with GPS and wireless web design. The tag location unit reads its location off GPS satellites every 15 seconds and keeps its last location in memory. When one goes online to locate a tag, the web host contacts the tag and pinpoints its exact location on a map, all in less than two minutes. Since GPS cannot track inside a building, if a car is stolen and taken inside, the web host will contact the tag and draw a map taking one to the front of the building where the car is being kept. No installation is required. The tag may be simply placed on the car as would any other tag, using the locking screws that that can only be removed by the dealer. When in a rush to demo a vehicle, one can place the tag under the seat, where it is held in place with Velcro locking loops, and the car can be tracked. A 24 hour tracking center may be provided that will track a stolen vehicle for those dealers not connected to the Internet, or other wide-area network.

DESCRIPTION OF THE DRAWINGS

The construction designed to carry out the invention will hereinafter be described, together with other features thereof.

The invention will be more readily understood from a reading of the following specification and by reference to the accompanying drawings forming a part thereof, wherein an example of the invention is shown and wherein.

DESCRIPTION OF A PREFERRED EMBODIMENT

The detailed description which follows is presented in terms of program procedures executed on a computer or a network of computers. These procedural descriptions and representations are the means used by those skilled in the art to most effectively convey the substance of their work to others skilled in the art. A object or module as herein described is generally a self-consistent sequence of steps leading to desired results. These steps are those requiring physical manipulations of physical quantities. Usually, these quantities take the steps of electrical or magnetic signals capable of being stored, transferred, combined, compared or otherwise manipulated. More specifically, an object or module is a section of computer readable code which is designed to perform a specific task or tasks. Actual computer executable code need not be contained with one file or one storage medium to constitute an object or module. Objects or modules generally receive input and provide output. The objects or module may receive information passed by another calling object or module and may output information to the calling object. A web host is computer hardware capable of creating and processing computer readable instructions and is not limited to a single computer. For example, mass storage, network communications, and main processing could be executed by three physically separate computers and would still constitute a web host. Therefore, the term "web host" is not intended to be limited to a single computer. Packets are electronic messages or information together with an Internet address which are sent as one unit. A datagram is a complete message and can be sent in many or one separate packet. With these terms in mind, the preferred embodiment is described in more detail.

Figure 1:
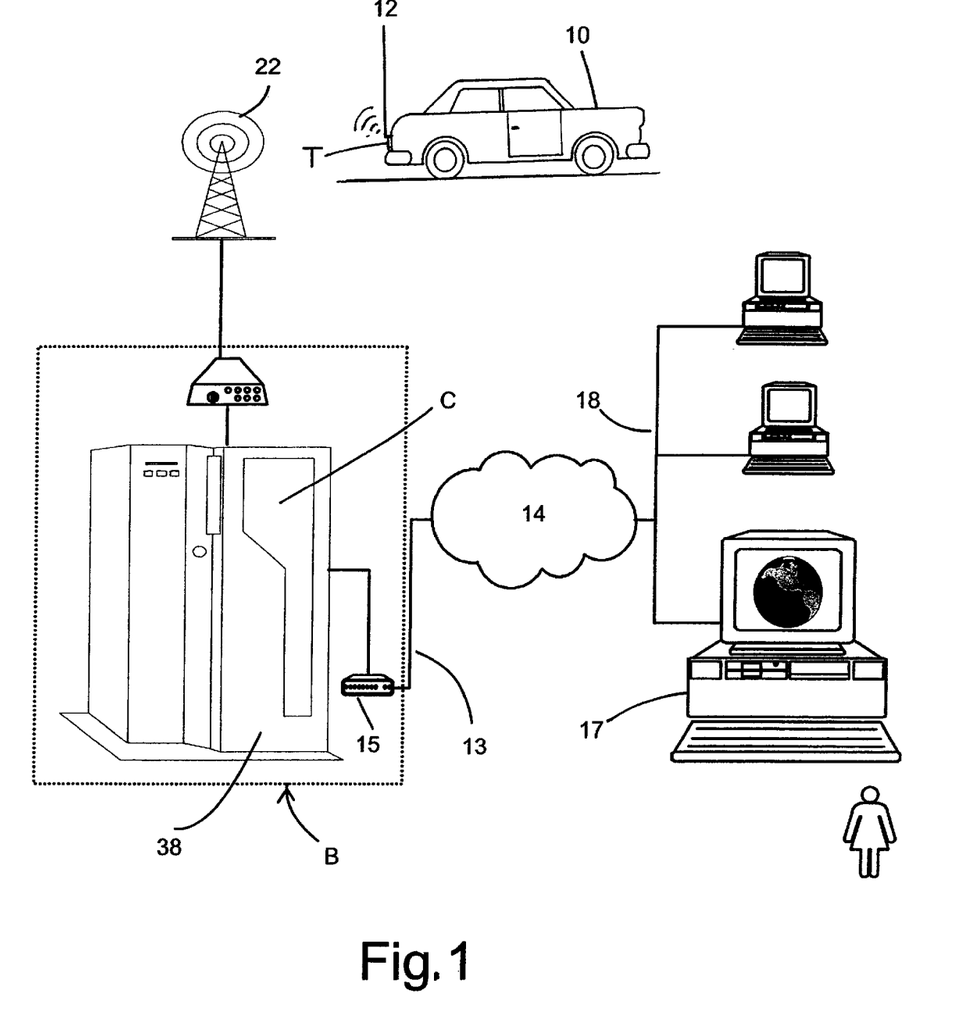
FIG. 1 is a schematic view illustrating an automobile tracking and anti-theft system according to the invention.
Figures 6, 7:
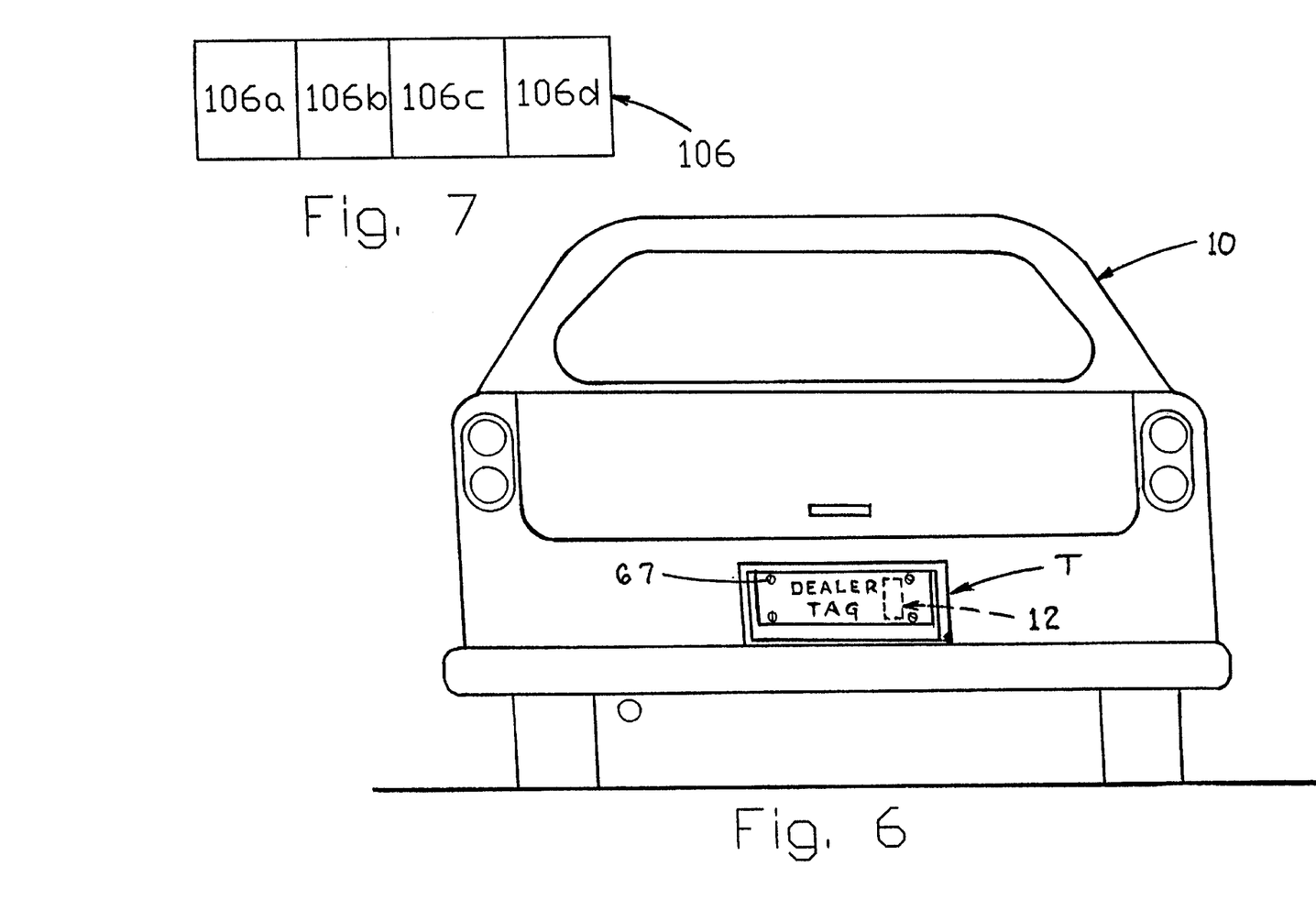
FIG. 6 is a rear elevation of an automobile having a tracking tag with a unique tracking unit according to the invention.
FIG. 7 is a schematic illustration of a digital data packet containing location data according to the invention.
Figure 8:
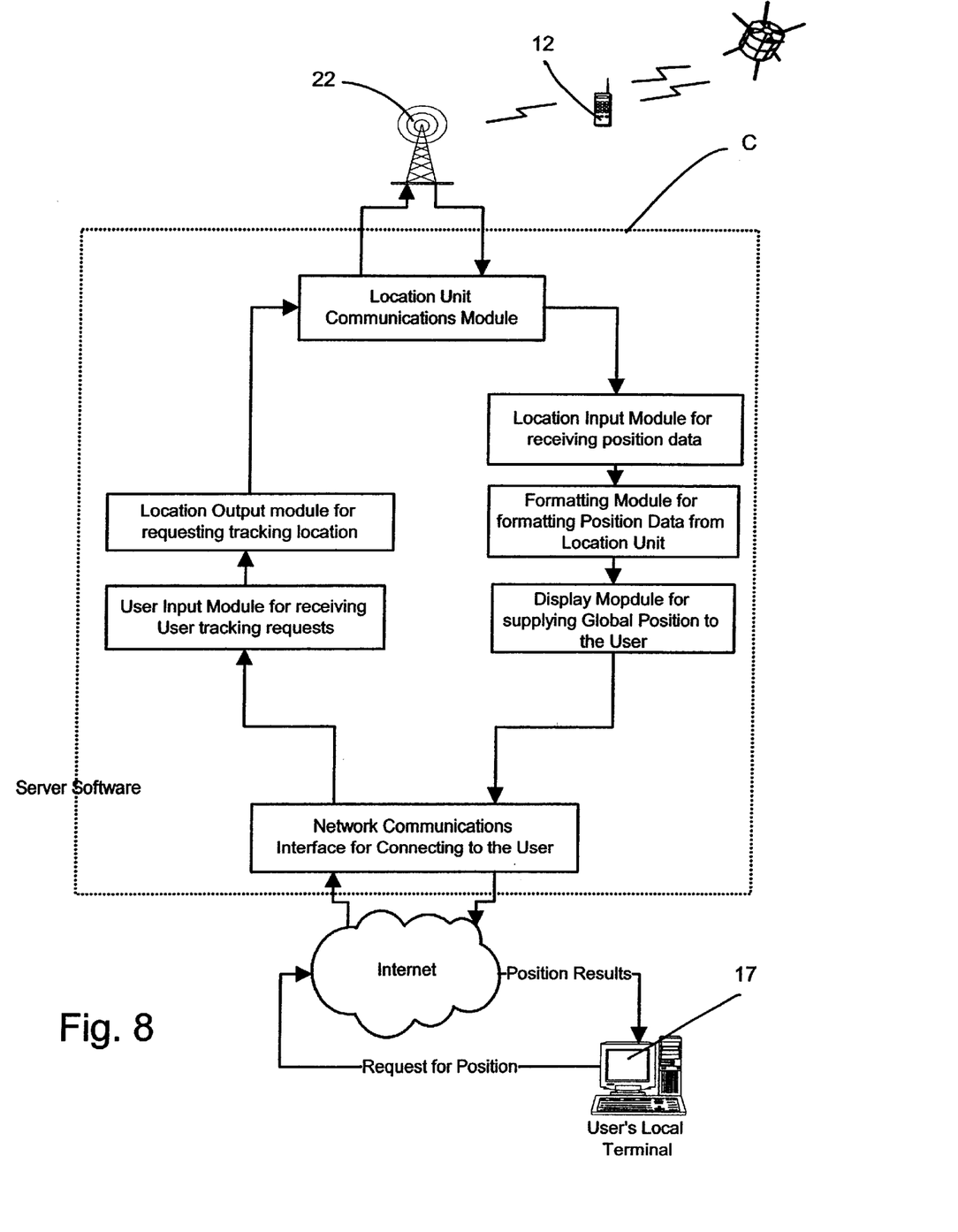
FIG. 8 is a flow diagram of a computer program for a web host according to the invention.

Referring to the drawings, an Internet based personal tracking system, designated generally as A, is illustrated for tracking a position for an automobile 10 to which a location unit 12 is affixed, as can best be seen in FIGS. 1 and 6. The term "automobile" is used to mean any vehicle whether for transporting passengers or something else. The tracking system includes a web host B connected to the Internet 14, or other wide area network, through a network connection device 15. A computer program C runs on web host B and receives a tracking request from a subscriber or user 16 through the user terminal 17. The web host receives location data from location unit 12 through a cellular network 22 and a modem 20; and makes the location data accessible by subscriber 16 through the subscriber's terminal 17.

As best can be seen in FIG. 1, web host connection 13 to the Internet 14 allows a multitude of subscribers 16, for example 16a, 16b, 16c, etc., to simultaneously access web host B. Each subscriber has a connection 18 to the Internet allowing access to the web host. The term "subscriber" means anyone with authorized access to the web host, whether payment is exchanged or not, e.g. any authorized user of the system or method. In addition to a connection with the Internet, web host B has a communication connection 19 for connecting the web host to a modem 20. Modem 20 allows web host B to initiate cellular tracking calls to automobile location unit 12. When dialing cellular numbers, modem 20 connects to a cellular network 22 through a phone line 21. The web host can then transmit and receive data from automobile location unit 12 through cellular network 22 allowing for location unit 12 to send location data to web host B.

Figure 2:
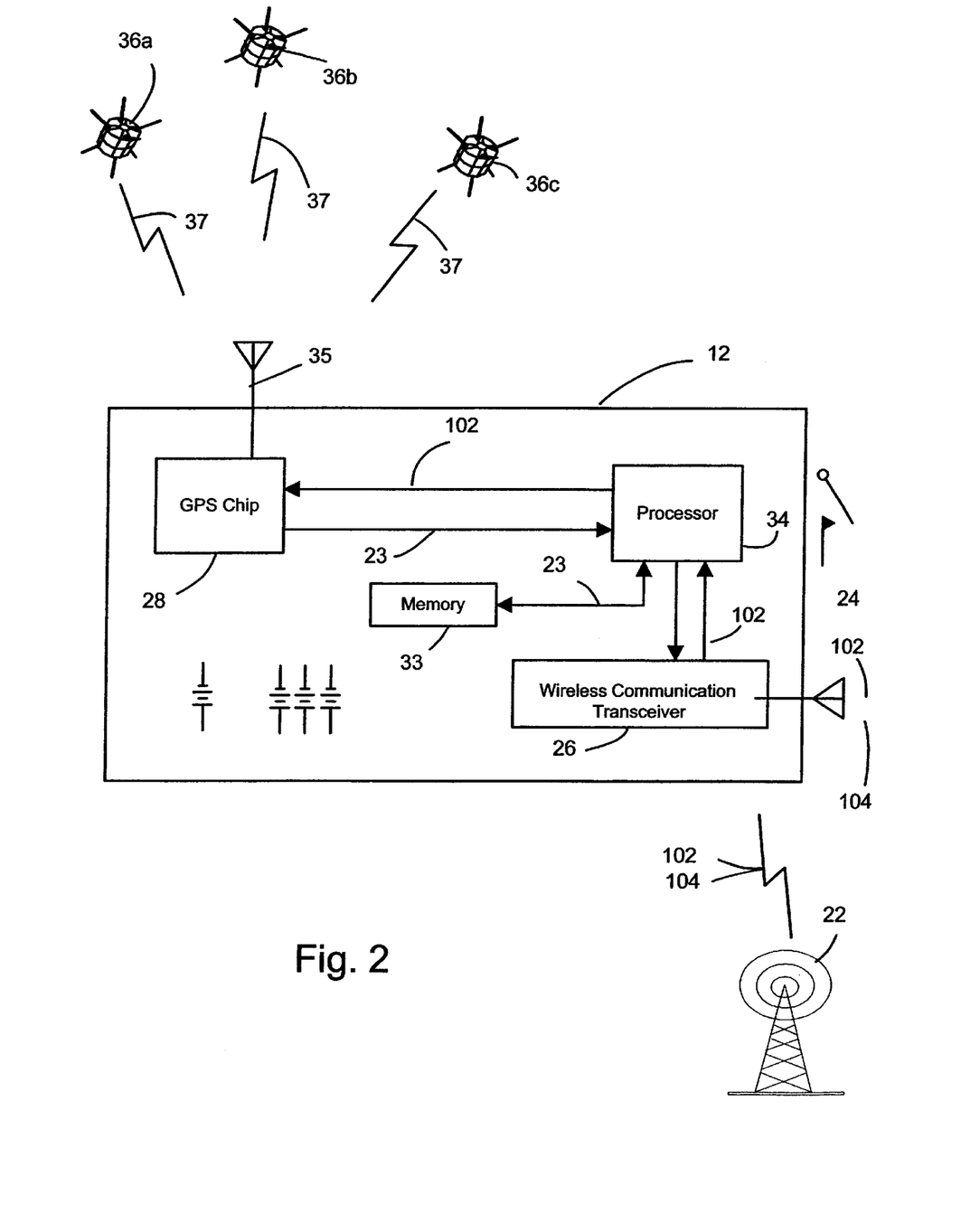
FIG. 2 is a schematic illustration of a wireless location unit and system for use in an automobile tracking and anti-theft system according to the invention.

Automobile location unit 12 is further illustrated in FIG. 2, as made integral with a dealer Internet tracking tag "T." In order to provide the functionality required for a subscriber to track an automobile, location unit 12 may be a simple GPS based device using digital cellular communications. Location unit 12 includes a GPS chip 28 carried within an enclosure for reading information from a global positioning satellite system. Global position satellites 36a–36c, generate signals 37 which are received through an antenna 35 of unit 12 and forwarded to GPS chip 28. Any suitable GPS chip may be utilized such as a model Superstar (with antenna), available from Canadian Marconi of Quebec, CN. GPS chip 28 passes the information to a processor 34. Processor 34 then may calculate latitude, longitude, and altitude of the device and, therefore, of the automobile. Once calculated the position information is transmitted to a cellular network 22 by a wireless transceiver 26 using a wireless communication antenna 32. Memory 33 may be included within automobile location unit 12 to hold a number of previous GPS readings which can be used to show the prior path or track of the location unit and tracked automobile, as disclosed in the above application. Other, non-GPS, location calculating methods and chips may also be utilized. Processor 34 is programmed to control location unit 12 on stand-by, automatically answer a position inquiry from a concerned user, poll the GPS chip and received GPS position information, transmit the position information to the host, terminate the call, and return to stand-by.

Automobile location unit 12 can be powered by a stackable power supply 30. Stackable power supply 30 may include stackable thin film batteries as have been recently developed for the cellular market. Since the location unit 12 only receives a tracking request and transmits location data, the power required is significantly less than the traditional cellular phone. With this advantage as well as eliminating the need for voice communication, location unit 12 requires less power and may be a significantly smaller unit than the traditional cellular phone.

The GPS chip creates tracking information 23 which includes the latitude and longitude of locator device A. Tracking information 23 is transmitted via transceiver 26 over lines 24, and may be stored in memory 33. Transceiver antenna 32 transmits the tracking information in the form of location data 104 to remote relay antenna 22. Any suitable transceiver device may be utilized, such as that available from Motorola of Schaumburg, Ill., Model 650. GPS chip 28 reads the tracking signals of the locator device at any desired interval, such as every 30 minutes. The GPS chip may be adjustable so that the reading interval may be adjusted as desired. The transceiver 26 is on standby at all times. The processor/memory can store a predetermined number of the GPS readings, for example, the previous 100 readings. It is advantageous to store a predetermined number of previous readings in the event a stolen automobile is parked inside a building or other environment in which it is not possible to receive satellite signals and obtain GPS readings. In this case, when the locator device is called, a trail of the past 2 days positions can be downloaded to the base station to help pinpoint the automobile's current location.

When a tracking call 102 is received from the web host in order to determine the automobile's location, the transceiver automatically answers the call and activates processor 34. The processor is programed to automatically retrieve the automobile's location tracking information stored in the processor chip and transmit location data 104 to web host B. The programming of the processor will be well within the purview of the average artisan in the automatic programming art having been taught the expedients and operation of the present invention. At the web host the digital location data 104 is received by modem 20 wired to computer 38.

In accordance with the invention, digital location data 104 which is output by location unit 12 is in a special format so that low power requirements are needed to transmit the signal. The signal is purely a data signal and contains no voice or sound. Since there is no voice, the unit outputs only a very small digital location data packet. For example, location data 104 may include a small digital data packet 106, containing only protocol data 106a, a unit code number 106b identifying the subscriber/vehicle to which the locator unit is assigned, longitude data 106c, and latitude data 106d. Therefore low power is required to transmit the data. The high power requirements associated with analog sound and voice transmission of full cellular transmissions are eliminated. For example, transceiver device 32 may only require 0.6, or even 0.3, watts. Means for powering GPS chip 28, processor 34, and transceiver 26 may be provided by a miniature rechargeable battery system designated generally as 30. The rechargeable battery system may be a miniturized, lightweight version of a lithium ion battery and recharging system such as disclosed in U.S. Pat. No. 5,742, 233 or may be recently developed thin film battery technology.

While the digital telephone system is preferred, national coverage may not presently exist for digital technology. When national coverage does exist, the digital technology will provide an advanced location system which will have faster and more long distance communication and longer battery life. However, for the present, the wireless communications between the location unit 12 and the web host B may be had using cellular analog transmissions. Cellular telephone systems currently provide national coverage necessary to allow the location device to function on a national basis.

Transceiver 26 remains in a standby, power reducing mode until the web host initiates tracking call 102. The web host sends out the cellular tracking call and the transceiver automatically answers the call, and transmits location data representing the present coordinates to the web host. The transceiver then automatically hangs up and returns to standby. The automobile location unit can also transmit previously stored coordinates to the base station as described above. For this purpose, processor 34 may be programmed to send either the current location data, the location history which includes all the stored locations, or any number of the stored locations. The unit may be programmed to send the desired location data depending on a corresponding tracking call request from the web host.

Figure 4:
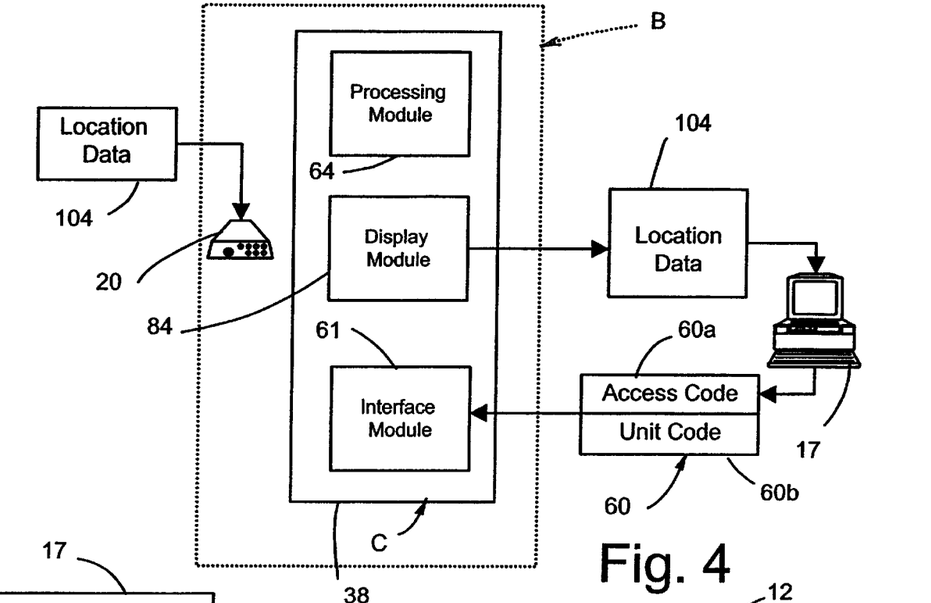
FIG. 4 is a schematic diagram of a web host and computer program for an automobile tracking and anti-theft system according to the invention.

FIG. 4 illustrates the basic components of web host program C which accomplishes these tasks. The web host program compromises a set of computer readable instructions embodied in a computer readable medium located on the web host computer 38. To initiate a tracking call, the program receives a tracking request datagram 60 generated by subscriber terminal 17 sent to web host B. Datagram 60 includes an unique access code 60a and an unique unit code 60b supplied to the subscriber. The program includes an interface module 61 which includes the instructions necessary for terminal 17 to communicate with web host B. Interface module 61 passes request datagram 60 to a process module 64. Processing module 64 includes a set of instructions for receiving datagram 60, validating the access and unit codes, and requesting and receiving the GPS location data for making the same available to the subscriber, as more fully described below.

Figure 5:
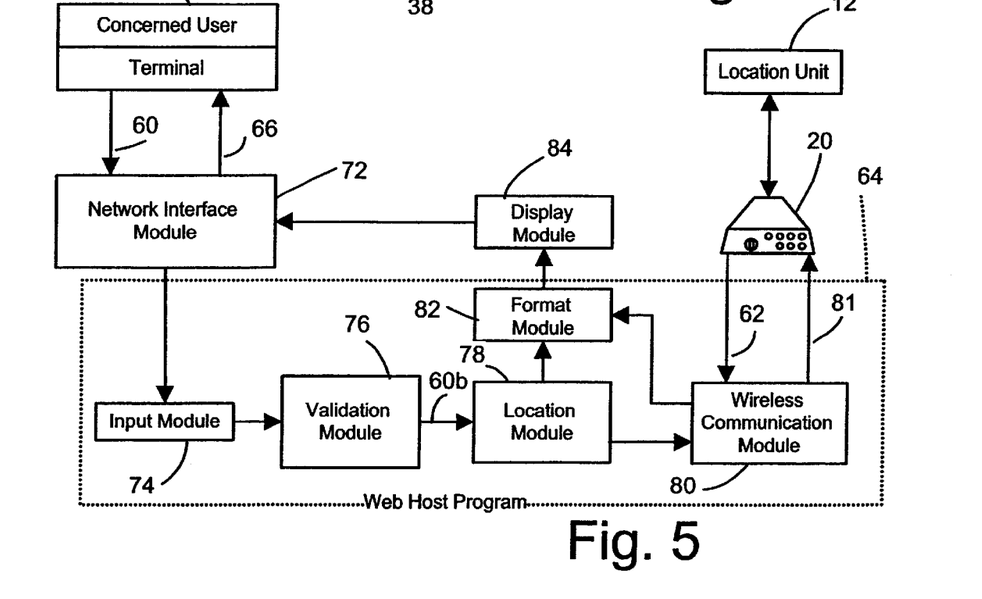
FIG. 5 is a schematic diagram of the modules contained with the computer program residing on the web host of an automobile tracking and anti-theft system according to the invention.

As best can be seen in FIG. 5, processing module 64 includes an input module 74 for receiving tracking request datagram 60. There is a validation module 76 having instructions for receiving the access code and determining if the access code is valid and whether processing can continue. There is a location module 78 which receives unit code 60b for further processing if the processing continues. Location module 78 includes a set of instructions for initiating wireless communication through a wireless communication module 80. Wireless communication module 80 includes instructions for polling automobile location unit 12 by making a cellular phone call through modem 20. Connected wireless communication module 80 sends a tracking call datagram 81 which is received by transceiver 26 of automobile location unit 12. Wireless communication module 80 also includes the instructions for receiving and processing GPS position data and forwards this data to a format module 82. The format module includes instructions which create position information 66 and provides a user readable representation of the position of automobile 10 such as a map display or position coordinates. A display module 84 includes a set of instructions to create a datagram containing vehicle position information 66 to be accessed by the subscriber's terminal 17. Network interface module 72 includes instructions for receiving position information 66 and allowing the subscriber to know and/or display the global position of the vehicle being tracked. Location unit 12 responds to tracking call datagram 81 by determining its global position through satellites 36a–36c (FIG. 2) and temporary stores this tracking information. Location data 104 is then transmitted back through modem 20 to wireless communication module 80.

Figure 3:
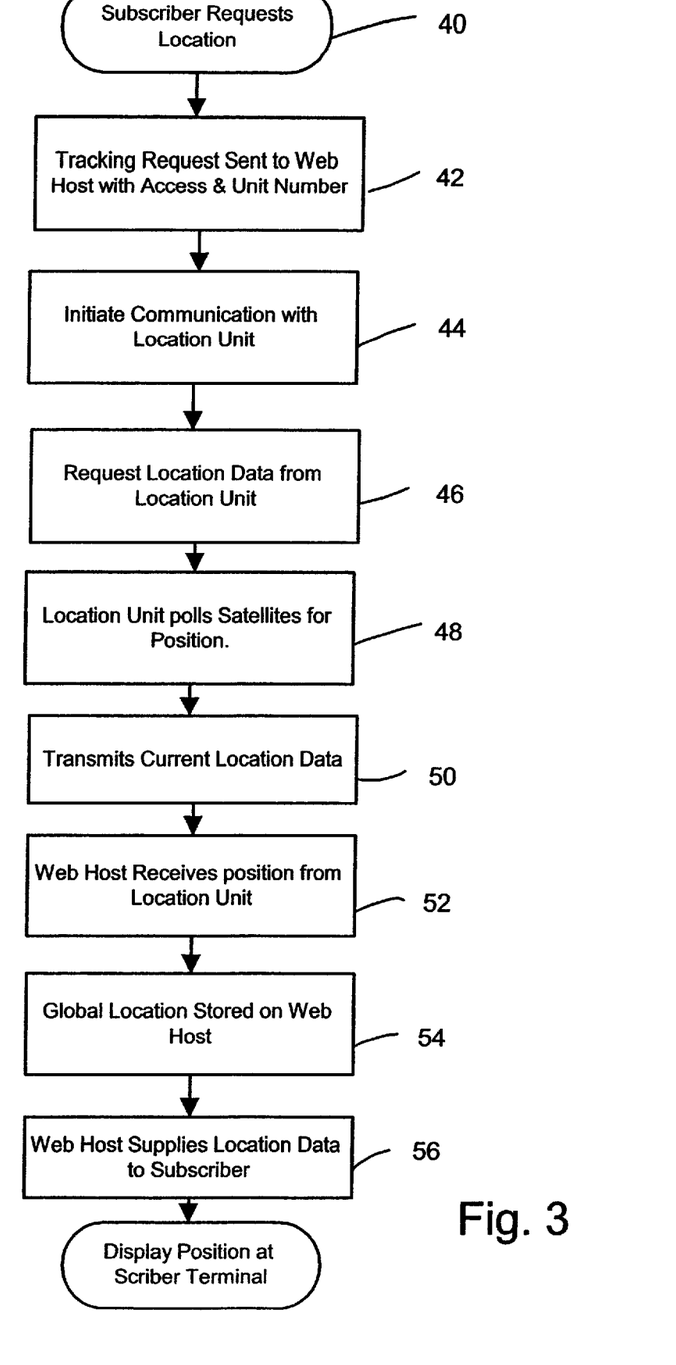
FIG. 3 is a process flow diagram illustrating an atomobile tracking and anti-theft system according to the invention wherein a metwork subscriber can access a web host for tracking a stolen vehicle.

In use, as can best be seen in FIG. 3, subscriber 16 can discover the global position of automobile 10 by accessing web host B through terminal 17 connected to web host B by the Internet. To do this, the subscriber enters a domain name for web host B such as www.satcel.com in step 40 of FIG. 3. When the remote user enters a domain name, a datagram is created at terminal 17 and transmitted across the Internet, from the subscriber to the web host, which contains the Internet addresses of the user. At this point, the subscriber enters a tracking request which includes system access number 60a and a subscriber unit code 60b which is unique to location unit 12. At step 42, a datagram is created containing the subscriber's input and sent to the web host. Upon receiving the remote user's request, the web host initiates communication with the automobile location unit at step 44 by initiating a cellular telephone call to the automobile location unit. The automobile location unit answers the call without any further action, nor with any notification to the individual in the vehicle. The web host sends a small compressed digital packet requesting the global position of the automobile location unit. Such a packet need only include a single character or two, as discussed above.

Once communication with the automobile location unit is initiated, the web host requests location data from the automobile unit at step 46. The automobile location unit then polls GPS satellites for determining its global position at 48. The GPS satellites transmit the location data and the automobile location unit receives the data at step 50. The automobile location unit then constructs a packet containing the global location data and sends the packet back to the web host. The web host receives the location data and stores the information at 52 either in permanent or temporary memory. At this point, cellular communication is terminated. At 54, the web host formats the global position of the individual based upon the stored location data. The results of the formatting would be a map display, street address or position coordinates. Once this formatting is complete, the web host makes the global position information available to the subscriber user at 56. The web host, associating the automobile location unit number and subscriber's Internet address, constructs datagram 60 (FIG. 4) containing the automobile's location. This datagram is sent to the subscriber's terminal across the Internet. The subscriber receives the datagram and a display of the global position of the automobile is created at the subscriber's terminal. Once the initial map is displayed the user has the option to zoom in or out on the position of the tracking unit. FIG. 1 shows a representation of the display at the user's terminal once the automobile location unit has been found. Map 90 shows the global position of the location unit by icon 92. Beneath the map contains geo-coordinates 94 showing latitude, longitude, speed and the heading of the location unit. By using drop-down bar 96, the subscriber can select from displaying the entire United States to displaying the specific location at the street level of the automobile being tracked. FIG. 7 shows the map of the tracked automobile and automobile location unit at the street level.

While the Internet is the preferred and most expedient method of providing communication between the subscriber and the web host, multi-user networks including Local Area Networks or Wide Area Networks using such communication connections as dial-up, ISDN, Ethernet, token ring, FDDI or other connection methods well known in the art would also provide such a communication connection. Additionally, while cellular communication is the preferred and most expedient method of providing communication between the web host and automobile location unit, any wireless communication such as satellites, microwave, or infrared would provide such wireless communication. The location data received by the automobile location unit 12 from the GPS satellites 36a–36c can be converted into the global position of the automobile either at the automobile location unit itself or the raw position data can be passed to the web site and the global position calculated there. Additionally, position data may be derived from sources other than GPS such as GLONASS, Triangulation, or signal strength determination.

As can best be seen in FIG. 6, location unit 12 is preferably concealed within dealer tracking tag "T" which is affixed to vehicles leaving the dealer lot, such as automobiles being test driven and demos. Preferably, the unit is laminated between two plates the size of the dealer/automobile tag, and sealed therein. Location unit 12 may also be incorporated in the frame of the front or back tag of a vehicle owned by a private owner. However, in the case of a private owner, it may be more advantageous to install the location unit in a place which cannot be easily tampered with by a thief. In the case of a dealer tag or frame, the tag or frame may be affixed to the vehicle by means of lock screws 67 which cannot be removed unless they are removed by a special tool in the possession of the dealer/subscriber. In addition, it is also possible that a connection may be made between the dealer tag and the vehicle by using a protection key 25 so that if the tag is removed from the vehicle without authorization, a position signal will be initiated simultaneously. In that case, the protection key is pulled out by the connection when the tag is removed. Once key 25 is activated, auxiliary power supply 31 enables location unit 12 to transmit its current GPS location to cellular network 22, and to the web host and subscriber. If the subscriber is not online, a location message will be displayed the next time the subscriber goes online. Therefore, the subscriber is warned of the current location in the event the key is activated.

While a preferred embodiment of the invention has been described using specific terms, such description is for illustrative purposes only, and it is to be understood that changes and variations may be made without departing from the spirit or scope of the following claims.

What is claimed is:

1. A computerized system for determining the theft of a vehicle wherein a system subscriber maintains a remote computer terminal, said system comprising:

a web host connected to a wide area web network, said web host having a computer readable medium;

a location unit for being carried by the vehicle for calculating the location of the vehicle at any given time and transmitting a low power digital location data packet having location data, wherein the data packet includes only protocol data, a personal code number as an identifier, and GPS data, including latitude and longitude; and a computer program having instructions embodied in computer readable code residing on said web host for receiving a tracking request from the subscriber, transmitting a tracking call to said location unit, receiving back the low power digital location data packet having location data from said location unit representing the current position of the vehicle automatically in response to said tracking request, and transmitting the location data regarding the current position of the vehicle to said subscriber whereby the location of the automobile is displayed at the subscriber's terminal.

2. The system of claim 1 wherein said computer readable instructions include:

input instructions for receiving said tracking request signal from the remote user via the Internet, said tracking request having a location unit identification;

processing instructions for receiving said tracking request and processing and routing said tracking request;

communication-instructions-initializing-wireless-communication with the location unit;

location instructions responsive to said processing instructions for generating said tracking call and outputting said call to the location unit and for receiving said location data from said location unit; and a display module for outputting said location data for display of the location unit's position by the the remote user via the Internet.

3. The system of claim 2 wherein input instructions are contained in an input module, said communications instructions are contained in a communications module, said location instructions are contained in a location module, and said display instructions are contained in a display module; and including a main processing module for calling said communication, location, and display modules to carry out their respective instructions.

4. The system of claim 3 wherein validation instructions are contained in a validation module called by said main module.

5. The system of claim 1 wherein said computer readable instructions include:
formatting instructions for formatting said location data into a display map of the current location of the location unit, and display instructions for outputting said map to the remote user via the Internet.

6. The system of claim 5 wherein said display map includes a position indicator indicating the current location.

7. The system of claim 1 wherein said tracking request includes a unit identification number, and said computer readable instructions include:
validation instructions for comparing said unit identification number to an access code stored on said web host, and said instructions allowing said input instructions to generate said tracking call when said unit identification number corresponds to an authorized access code.

8. The system of claim 1 wherein said location unit comprises:
an enclosure;
a location chip carried within the enclosure for receiving raw geo-position information;
a processor for receiving said raw geo-position information and generating personal location data representing the position of the unit;
a transceiver for transmitting said location data to a remote station in response to a call signal being received from said remote station;
said processor controlling said transceiver to transmit said location data in response to automatically answering said call signal from said remote station; and
a power supply for supplying power to said location chip, said processor and said transceiver.

9. The system of claim 8 wherein said location chip is a GPS chip for receiving geo-position information from a global positioning system.

10. The system of claim 8 wherein a computer readable medium is included within said processor and including:
a set of computer instructions embodied in said computer readable medium wherein said instructions perform the steps of:
detecting a tracking request;
requesting tracking information signals from said location chip;
generating location data from said tracking information signals; and,
providing said location data for transmission to a remote location.

11. The system of claim 10 wherein said instructions include means embodied in computer readable code for returning said processor to a standby mode after transmission of said location data to said remote location.

12. The system of claim 8 wherein said location data is embodied in a digital signal containing digital data only, and having no audio signal.

13. The device of claim 12 wherein said digital signal includes a digital record which includes access code data identifying a specific object to which the device is assigned, and location data.

14. The system of claim 1 where said location unit is carried by a dealer vehicle tag which may be affixed to the vehicle in the same manner as a license plate.

15. The system of claim 14 including tamper resistant locking means for securing said dealer tag to the vehicle.

16. The system of claim 14 including a protector key automatically transmitting location data to the web host in the event of an unauthorized removal of the dealer tag from the vehicle.

17. The system of claim 14 wherein said location unit is incorporated into one of said dealer tag and frame surrounding the dealer tag in an integral inconspicuous manner.

18. A system for deterring and preventing theft of a vehicle from a system subscriber who affixes a location unit to the vehicle whose theft is to be deterred wherein said location unit calculates the location of the vehicle at ay given time, wherein said location unit includes a processor and transmitter to transmit a low power digital location data packet having location data, and a memory for storing a plurality of previous position readings, said processor operative for automatically retrieving position readings stored in memory upon receipt of a tracking request, said system comprising:
a web host connected to a wide area web network, said web host having a computer readable medium;
said web host being accessible by the subscriber from a remote computer terminal;
a computer program residing on said web host for receiving a tracking request from a dealer and transmitting a tracking call to the location unit carried by the vehicle; and
said computer program including instructions embodied in computer readable code for automatically transmitting said tracking call, receiving the low power digital location data packet having location data, including retrieved position readings stored in memory, from the location unit in response to said tracking call, and transmitting location data regarding the current position of the vehicle to the subscriber's terminal where the current location of the vehicle is displayed and a prior path or track of the location unit.

19. The system of claim 18 wherein said web host is accessible concurrently by a plurality of subscribers for sending out concurrent tracking calls to a plurality of respective location units carried by vehicles sought to be located.

20. The system of claim 19 wherein said subscribers include automobile dealers seeking to deter the theft of vehicles being driven off premises.

21. The system of claim 18 wherein said computer readable instructions include:
input instructions for receiving said tracking request signal from the remote user via the Internet, said tracking request having a location unit identification;
processing instructions for receiving said tracking request and processing and routing said tracking request;
communication instructions initializing wireless communication with the location unit;
location instructions responsive to said processing instructions for generating said tracking call and outputting said call to the location unit and for receiving said location data from said location unit; and
a display module for outputting said location data for display of the location unit's position by the the remote user via the Internet.

22. The system of claim 18 wherein said computer readable instructions include:

formatting instructions for formatting said location data into a display map of the current location of the location unit, and display instructions for outputting said map to the remote user via the Internet.

23. The system of claim 22 wherein said display map includes a position indicator indicating the current location.

24. The system of claim 18 wherein said tracking request includes a unit identification number, and said computer readable instructions include:
   validation instructions for comparing said unit identification number to an access code stored on said web host, and said instructions allowing said input instructions to generate said tracking call when said unit identification number corresponds to an authorized access code.

25. The system of claim 18 wherein a computer readable medium is included within said processor and including:
   a set of computer instructions embodied in said computer readable medium wherein said instructions perform the steps of:
      detecting a tracking request;
      requesting tracking information signals from said location chip;
      generating location data from said tracking information signals; and,
      providing said location data for transmission to a remote location.

26. The system of claim 18 wherein said location data is embodied in a digital signal containing digital data only, and having no audio signal.

27. The system of claim 18 wherein said location unit includes a processor and transceiver; and said processor including instruction embodied in computer readable code so that said location unit automatically answers a tracking call, transmits said location data to said web host, hangs up, and returns to a standby mode.

28. A method of deterring theft of vehicles from automobile dealers wherein said dealers have computer terminals with displays, said method comprising:
   providing a web host connectable to a plurality of the dealer terminals concurrently;
   providing a plurality of location units for affixation to the vehicles located at the dealer lots;
   receiving a tracking request at said web host initiated at said dealer's terminal seeking the present location of a vehicle;
   transmitting a tracking call to the location unit whose location is desired in response to receiving said tracking request;
   receiving a low power digital location data packet having location, wherein the data packet includes only protocol data, a personal code number as an identifier, and GPS data, including latitude and longitude, data at said web host from the location unit representing the current location of the vehicle in response to said tracking call; and
   transmitting said location data to the computer terminal of the dealer for display of the current location of the vehicle on the dealer's terminal display.

29. The method of claim 28 including placing said location unit on said vehicle by securing a dealer license tag to the vehicle which carries said location unit.

30. The method of claim 29 including securing said dealer tag to the vehicle by using tamper resistant locking screws.

31. The method of claim 29 including automatically transmitting location data to the web host in the event of an unauthorized removal of the dealer tag from the vehicle.

32. The method of claims 28 including placing said location unit on said vehicle by securing said location unit with an interior space of the vehicle.

33. The method of claim 28 including providing a computer program residing on said web host for receiving a tracking request from the dealer and transmitting a tracking call to the location unit carried by the vehicle; and
   said computer program includes the steps of automatically transmitting said tracking call, receiving location data from the location unit in response to said tracking call, and transmitting the location data to the computer terminal of the subscriber where the current location of the vehicle is displayed.

34. The method of claim 33 wherein said computer program includes instructions which include the steps of:
   receiving said tracking request signal from the remote user via the Internet, said tracking request having a location unit identification;
   receiving said tracking request and processing and routing said tracking request;
   initializing wireless communication with the location unit;
   processing instructions for generating said tracking call and outputting said call to the location unit and for receiving said location data from said location unit, and outputting said location data for display of the location unit's position by the the remote user via the Internet.

35. The method of claim 28 including providing concurrent access to said web host from a plurality of subscribers for sending out concurrent tracking calls to a plurality of respective location units carried by vehicles sought to be located.

36. A method of deterring theft of vehicles from automobile dealers wherein said dealers have computer terminals with displays, said method comprising;
   subscribing to a web host accessible from the dealer terminal;
   assigning a location unit to the vehicle whose theft is to be deterred by physically placing the location unit on the vehicle, wherein said location unit includes a processor and transmitter operable for transmitting a low power digital location data packet having location data, and a memory for storing a plurality of previous position readings, said processor operative for automatically retrieving position readings stored in memory upon receipt of a tracking request;
   initiating a tracking request at said dealer terminal which is transmitted to said web host whereby a tracking call is transmitted from said web host to the location unit assigned to the vehicle and low power digital packet having location data representing the location of the vehicle is transmitted to said web host from the location unit; and
   receiving said location data, including retrieved position readings stored in memory at said dealer terminal and displaying the location of the vehicle on the dealer's terminal display and a prior path or track of the location unit claims.

37. The method of claim 36 including placing said location unit on said vehicle by securing a dealer license tag to the vehicle which carries said location unit.

38. The method of claim 37 including securing said dealer tag to the vehicle by using tamper resistant locking screws.

39. The method of claim 37 including automatically transmitting location data to the web host in the event of an unauthorized removal of the dealer tag from the vehicle.

40. The method of claim 36 including placing said location unit on said vehicle by securing said location unit within an interior space of the vehicle.

41. A computerized system according to claim 18, wherein said location data of said low power digital location data packet transmitted from said location unit comprises one of at least longitude, latitude and an identifier number for the subscriber/vehicle.

42. A computerized system according to claim 18, wherein said location data of said low power digital location data packet transmitted from said location unit comprises data to be later processed for determining the vehicle location.

43. A computerized system according to claim 36, wherein said location data of said low power digital location data packet transmitted from said location unit comprises one of at least longitude, latitude and an identifier number for the subscriber/vehicle.

44. A computerized system according to claim 36, wherein said location data of said low power digital location data packet transmitted from said location unit comprises data to be later processed for determining the vehicle location.

* * * * *